June 30, 1925.
G. R. SISSON
MIXTURE CONTROL FOR INTERNAL COMBUSTION ENGINES
Filed Oct. 29, 1923    3 Sheets-Sheet 1
1,544,350
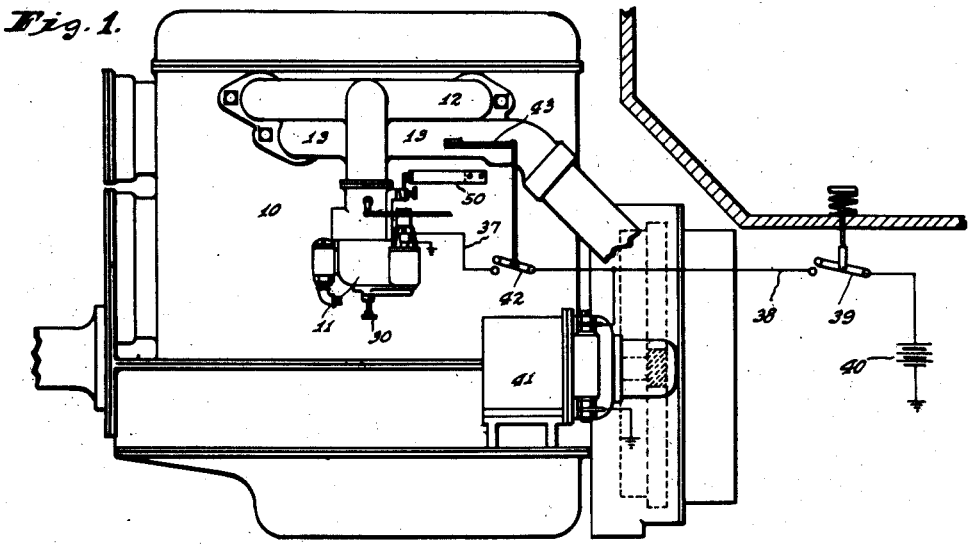
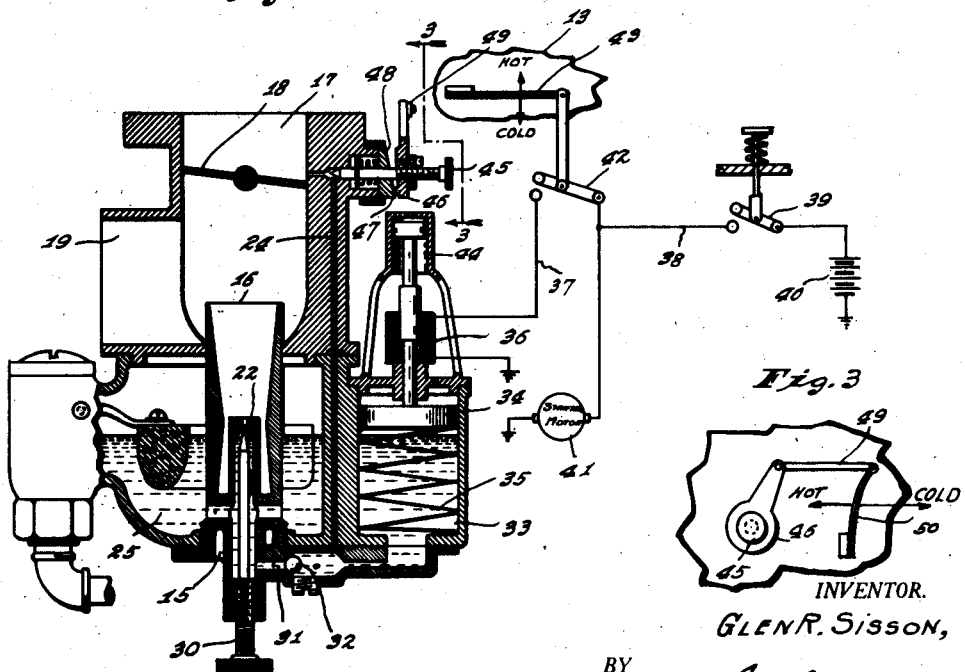
INVENTOR.
GLEN R. SISSON,
BY
ATTORNEY.

June 30, 1925.
G. R. SISSON
MIXTURE CONTROL FOR INTERNAL COMBUSTION ENGINES
Filed Oct. 29, 1923    3 Sheets-Sheet 2
1,544,350
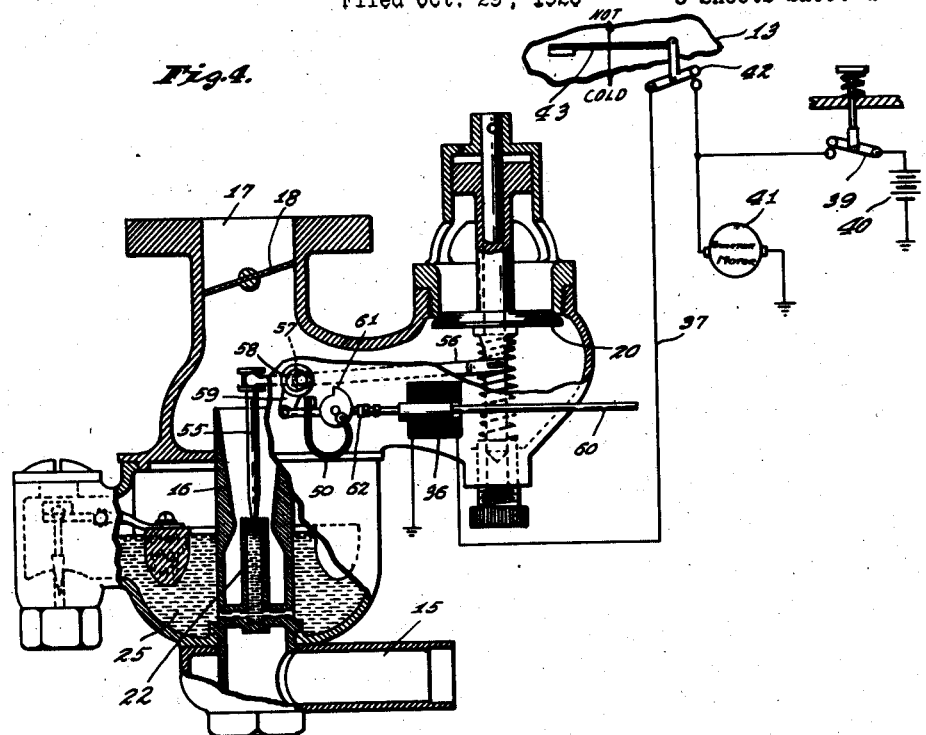
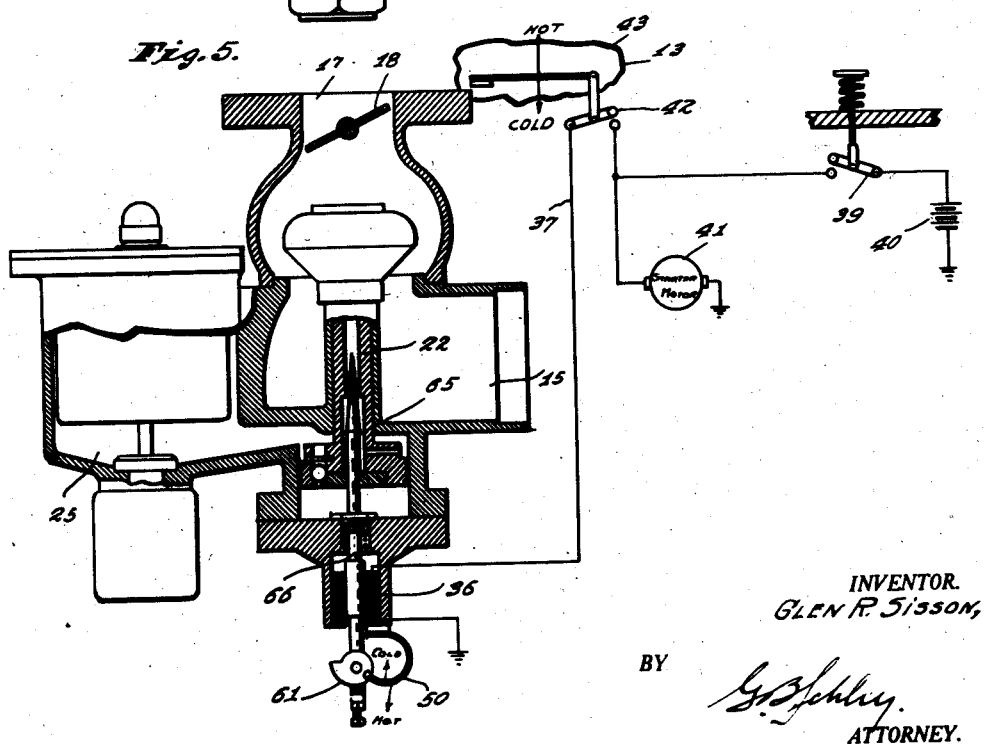
INVENTOR.
GLEN R. SISSON,
BY
*G. B. Schley.*
ATTORNEY.

June 30, 1925.
G. R. SISSON
MIXTURE CONTROL FOR INTERNAL COMBUSTION ENGINES
Filed Oct. 29, 1923    3 Sheets-Sheet 3
1,544,350
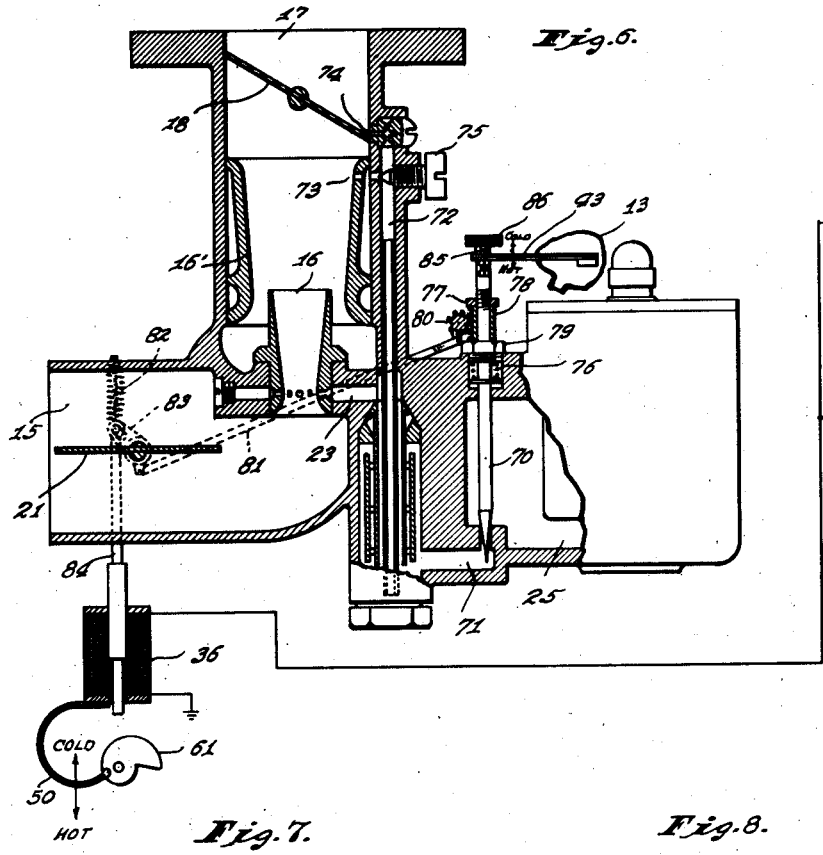
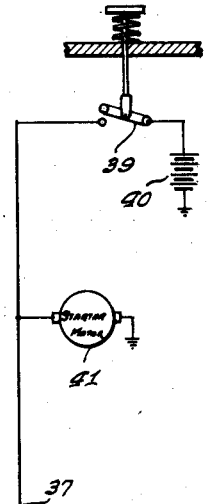
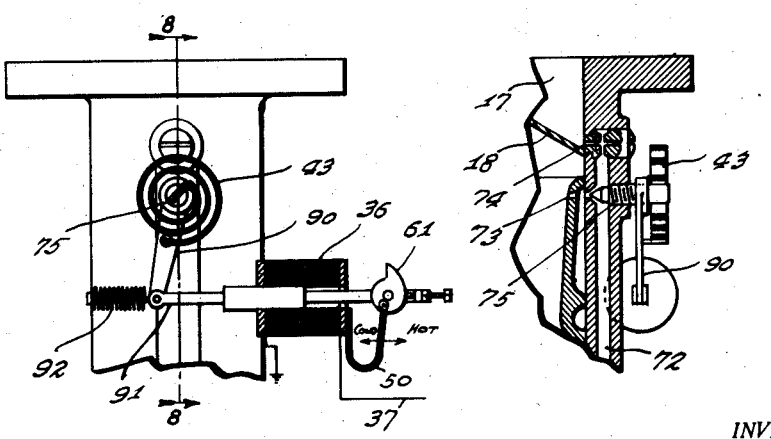
INVENTOR.
GLEN R. SISSON
BY
ATTORNEY.

Patented June 30, 1925.

1,544,350

UNITED STATES PATENT OFFICE.

GLEN R. SISSON, OF PENDLETON, INDIANA.

MIXTURE CONTROL FOR INTERNAL-COMBUSTION ENGINES.

Application filed October 29, 1923. Serial No. 671,512.

*To all whom it may concern:*

Be it known that I, GLEN R. SISSON, a citizen of the United States, residing at Pendleton, in the county of Madison and State of Indiana, have invented a new and useful Mixture Control for Internal-Combustion Engines, of which the following is a specification.

It is the object of my invention to provide an automatic control for the mixture supplied to internal combustion engines, and to carbureters, for automatically regulating relatively to each other the air-supply and the fuel-supply, especially during starting and warming up, and for compensation for temperature variations both in the air and in the engine, so that a sufficient mixture under all conditions may be obtained without requiring special skill on the part of the operator.

In the operation of automobiles, many drivers have difficulty, especially in and just after starting, and most pronouncedly in cold weather, in getting the right mixture. They may fail to start by having too much fuel in proportion to the air. They may fail to start by having too much air in proportion to the fuel. They may kill their engines immediately after starting, by providing too much air in proportion to the fuel or too little fuel in proportion to the air, especially in cold weather and with a cold engine. Even if they do succeed in getting the engine started and keeping it running, they are apt to have unsatisfactory operation by reason of too rich a mixture, on account of having too little air for a given amount of fuel or too much fuel for a given amount of air.

In accordance with my invention, I control the relation of the supply of air and fuel from the carbureter jointly by three conditions: The temperature of the engine, the temperature of the air, and the condition of the circuit of the starter motor for the engine; but my invention in some of its aspects requires control by only one or two of these conditions. I provide a device which is automatically actuated to increase the supply of fuel relatively to the supply of air for the carbureter while the circuit of the starter motor is closed, and to decrease the supply of fuel relatively to the supply of air when the starter-motor circuit is open. I impose upon this control by the starter-motor circuit, a second control by changes in the temperature of the engine; by relatively increasing the air supply with relation to the fuel supply as the engine warms up and decreasing it as the engine cools down. This control by temperature, or more specifically by engine temperature, and starter-motor circuit jointly is the subject-matter of my copending application Serial No. 634,576, filed April 25, 1923, but with the control acting through the control of the air, instead of being directed broadly as in the present case to the relative control of fuel and air. In another co-pending application, Serial No. 651,871, filed July 16, 1923, there is presented another specific invention coming within the scope of the present broad invention; in such prior application the subject being a control of the mixture by three conditions—named above—but with the control there directed to air control only, instead of control of the relative values of air and fuel.

In contradistinction to the limitations of such two prior applications, my present invention is directed broadly to the automatic control of the relation between the air supply and the fuel supply, whether or not that control is exerted through control of one or the other, or through the control of both. In its more specific aspect, my present invention is directed to the automatic control of the fuel supply to get this control of the relative amount of fuel and air. My invention contemplates the control automatically by all three conditions, or by less than all three of those conditions, as expressly set forth in the claims.

The accompanying drawing illustrates my invention: Fig. 1 is a side elevation of an automobile equipped with one form of my invention, with the automatic control on the supply for a supplemental feeding nozzle; Fig. 2 is an enlarged sectional detail of the carbureter and control apparatus of Fig. 1; Fig. 3 is a fragmental section on the line 3—3 of Fig. 2; Fig. 4 is another sectional view of a carbureter, of the auxiliary air type, with my control applied to the main fuel nozzle; and Fig. 5 is still another sectional view of a carbureter, of the plain tube type, with my control on the main fuel nozzle; Fig. 6 is a sectional view of still another type of carbureter, showing my invention applied thereto, with part of the control on the choker valve and part on a supplemental fuel jet; Fig. 7 is a fragmental view showing a modification of Fig. 6 in which the control on the choker valve is transferred to a fuel-controlling member; and Fig. 8 is a section on the line 8—8 of Fig. 7.

The engine 10 is supplied with explosive mixture by any suitable carbureter 11, different types of carbureters being shown in different figures. Any of these carbureters which is used supplies such explosive mixture to the engine through any sufficient intake manifold 12; and the exhaust gases from the engine are discharged through an exhaust manifold 13 in the usual way. In all the forms of carbureters that are shown, air is supplied through an air inlet opening 15, and directed through a suitable venturi 16, and thence on by way of the discharge opening 17 past a throttle 18 to the intake manifold 12, this air being either the only air supplied as in Figs. 5 and 6, or being supplemented by an auxiliary air-supply through a lateral air-inlet passage 19 which supplies the outlet passage 17 in parallel to the supply through the Venturi tube 16. When there is an auxiliary air supply, it may be controlled by a valve 20, shown as a spring-seated valve in Fig. 4. If desired, there may be a choker valve 21 in an air inlet passage, as the valve 21 is shown located in the main air inlet passage 19 in Fig. 6. In addition to the air supply or air supplies, there is a main fuel supply within the Venturi tube 16, in any suitable manner, as by a fuel nozzle 22 projecting along such Venturi tube, as shown in Figs. 2, 4, and 5, or by lateral fuel inlets 23 through the throat of the Venturi tube as shown in Fig. 6. The fuel supply at the throat of the Venturi tube 16 may be either the only fuel supply, or may be supplemented by an auxiliary fuel supply, as by a supplemental passage 24, as illustrated in Figs. 2 and 6. In both of those instances, the supplemental passage 24 is shown as feeding fuel up to a lateral feed opening entering the main passage in the vicinity of the throttle 18. The fuel supply is ordinarily taken from a float bowl 25.

I have shown these various types of carbureters merely as examples, to indicate some of the types of carbureters in common use; for my invention is applicable to any style of carbureter, and is not limited to those types which are shown.

Now referring specifically to the arrangement shown in Figs. 1, 2, and 3: The main nozzle 22 is supplied from the float bowl 25, and is controlled by a manual adjusting screw 30, in any convenient way. The float bowl also supplies fuel to a passage 31, in which there is a check valve 32 which permits passage of fuel only from the float bowl 25; and this passage 31 feeds both a supplemental reservoir 33 and the auxiliary fuel supply passage 24. The supplemental fuel chamber 23 is provided with a piston 34 which is spring pressed upward by a spring 35, but which may be pulled downward by a solenoid 36. The solenoid 36 is connected in a branch circuit 37 from the main starter circuit 38, so that when the starter switch 39 is depressed in the regular way in starting the engine a circuit is completed from the battery 40 through such starter switch 39 and the circuit 38 to the starter motor 41, with a branch leading through the branch circuit 37 and solenoid 36 so that the solenoid will be energized upon the energization of the starter motor. In the branch circuit 37, however, I provide a thermostatically operated switch 42, which is arranged to be operated by a thermostat 43 suitably mounted to be responsive to the temperature of the engine, as by being mounted on the exhaust manifold 13. When the engine is cold, or below a certain temperature, the thermostat 43 pulls the switch 42 closed, so that the solenoid 36 will be energized simultaneously with the starter motor 41 upon the closing of the starter switch 39. When the engine becomes heated, however, and rises beyond a certain temperature, the thermostat 43 operates to open the switch 42; so that under such conditions, which will occur if there is a starting soon after a stopping of the engine, the closing of the starter switch 39 produces no effect on the solenoid 36.

The engine being below the predetermined temperature, the closing of the starter switch 39 to energize the starter motor 41 causes the solenoid 36 to act to depress the plunger 34. This forces fuel out of the supplemental fuel chamber 35, through the auxiliary fuel passage 24, and into the mixture chamber of the carbureter, to cause an increase in the amount of fuel with relation to the amount of air over what it would otherwise be. The stem of the piston 34 is connected to a dash pot 44 so that the descent of such piston will be retarded and will continue over a considerable period, so that this supply of fuel may continue during the starting operation. This enrichment of the mixture facilitates starting, especially when the engine is cold; while when the engine is hot such enrichment does not occur because the switch 42 is open.

The outlet of the auxiliary fuel passage 24 is controlled by a screw 45. This screw is adjustable both manually and in response to the temperature of the air. To this end, the screw is mounted in a screw carrier 46 which co-operates through an abutment 47 with the cam surface 48 so that by turning the screw carrier 46 the screw 45 will be moved in or out. The screw-carrier 46 is connected by a link 49 to a thermostat 50 which is responsive to the temperature of the air. When the air is cold, the thermostat 50 moves the screw-carrier 46 to increase the size of the opening of the auxiliary fuel supply passage into the carbureter; while when the air is hot it decreases the size of such opening.

Thus by the two thermostats 43 and 50, and by the solenoid 36 controlled by the starter switch 39, I provide all three controls mentioned: control by the starter motor, control by engine temperature, and control by air temperature. These actually act on the fuel supply, in this case the auxiliary fuel supply, to control the proportions of the mixture, by increasing the amount of fuel with relation to the amount of air upon the closing of the starter motor circuit, provided the engine is cold, and by controlling the amount of such enrichment by the temperature of the air acting through the thermostat 50.

The arrangement shown in Fig. 4 operates on the same general principles, as applied to a different form of carbureter. Here there is only one fuel nozzle shown, the nozzle 22, and it is controlled by a controlling needle 55, which is connected by a lever 56 to the spring-seated valve 20 which controls the admission of auxiliary air. The lever 56 is mounted on eccentric pins 57 carried by a shaft 58 which outside of the carbureter has an operating arm 59. In the normal operation of the carbureter, the needle 55 which controls the size of the fuel-supply, moves up and down as the auxiliary air valve 20 is moved down and up, so that the size of the fuel supply varies with the size of the auxiliary air opening. To obtain my control, I operate through the arm, to vary the position of the needle 55 for a given position of the auxiliary air valve 20. To this end, the arm 59 is connected by a rod 60 to the core of the solenoid 36, which solenoid is connected in the same way as is the solenoid 36 in the arrangement shown in Fig. 2. In other words, this solenoid 36 is controlled primarily by the starter switch 39, and is connected in shunt to the starter motor 41, and in its branch circuit there is a switch 42 which is controlled by a thermostat 43 responsive to the temperature of the engine. When the starter switch 39 is depressed, to cause the operation of the starter motor 41, it also causes the energization of the solenoid 36, to swing the arm 59 to the right to raise the pivot pin 57 on which the lever 56 is mounted; which raises the needle 55 to admit more fuel into the stream of air which flows through the Venturi 16. When the starter switch 39 is released, the solenoid 36 releases its pull, and the pivot pin 57 drops back toward or to its normal position. The amount by which it drops back, however, is controlled by the temperature of the air, acting through the air-responsive thermostat 50. In this instance, the air responsive thermostat 50 is connected to a cam 61 which co-operates with a stop 62 on the stem 60 to limit the movement of such stem and of the arm 59 to the left. This thermostat 50 and cam 61 are so arranged that as the air temperature increases they permit a greater movement of the rod 60 and arm 59 toward the left, to increase the distance the needle 55 may descend upon the deenergization of the solenoid 36. This provides an automatic temperature control of fuel with relation to the air, in response to the temperature of the air.

In addition, as before, if the engine is warm when the starter switch 39 is closed, the switch 42 is held open by the engine-temperature-responsive thermostat 43, so that no energization of the solenoid 36 then occurs.

The arrangement shown in Fig. 5 is a very similar arrangement, in which the triple control referred to is provided on the main fuel-controlling needle. Here, however, the carbureter shown is an ordinary plain-tube carbureter, with no auxiliary air. The fuel outlet into the air space is controlled by a needle valve 65, which is a direct extension of the rod 66 which carries the core of the solenoid 36. The needle is spring-pressed upwardly, but is pulled downward by the solenoid 36. This solenoid is energized in the same way as in the arrangement already described, under the control of the starter switch 39 and of the engine-temperature-responsive thermostat 43; the upward fuel-decreasing movement of the needle 65 is controlled by a cam 61 governed by an air-temperature-responsive thermostat 50 to limit the fuel-decreasing movement of the needle 65 when the solenoid 36 is de-energized.

In the device shown in Fig. 6, there is a somewhat different arrangement. Here the fuel-needle 70 controls the supply of fuel from the float bowl 25 into a passage 71 from which both the main fuel-discharging openings 23 and a supplemental fuel passage 72 are supplied. The outlet of the supplemental fuel passage 72 is through openings 73 and 74 in the vicinity of the throttle 18, though the exact location of these is not essential to my present invention. One of the outlets 73 may be controlled by an adjusting screw 75 if desired. The fuel-controlling needle 70 is spring-pressed downward, toward closed position, by a spring 76, and may be manually adjusted by an abutment nut 77 which separably rests on a sleeve 78 through which the needle 70 is slidable. The sleeve 78 separably rests on the top of a packing-gland nut 79. By turning the nut 77, the needle 70 may be raised or lowered with relation to its seat. The sleeve 70 is provided with rack teeth which mesh with a pinion 80, provided with an operating arm connected by a link 81 connected to an operating arm on a choker valve 21 which is provided in the air inlet opening 15. The choker valve 21 is spring-pressed to wide-open position, by a spring 82, which, acting through the link 81 and pinion 80, tends to bring the sleeve 78 into contact with the packing-gland nut 79 to lower the needle 70 into proximity to its seat. The choker valve 21 has another operating arm 83, which is connected by a rod 84 to the core of the solenoid 36, which is connected as before in shunt to the starter motor 41 so that it will be controlled jointly therewith by the starter switch 39. Thus by depressing the starter switch 39 for causing operation of the starter motor 41, the solenoid 36 is energized; and this serves to move the choker valve 21 toward or to closed position, and also serves to raise the sleeve 78 so that the fuel-controlling needle 70 will be lifted from its seat to increase the supply of fuel. Thus with this arrangement, the operation of the starting motor 41 serves both to decrease the supply of air absolutely and to increase the supply of fuel absolutely, as well as to increase the supply of fuel with relation to the supply of air. When the starter switch 39 is released, the spring 82 moves the choker valve 21 and the sleeve 78 back to the normal position, in which they are shown, thus increasing the supply of air, and decreasing the supply of fuel. The extent to which the closing movement of the choker valve 21 and the raising of the sleeve 78 takes place, however, is controlled by the cam 61 which limits the movement of the core of the solenoid 36 and is controlled by the thermostat 50 which is responsive to the temperature of the air. The cooler the air, the farther the cam 61 permits the closing of the choker valve 21 and the opening of the needle valve 70. In addition to this control of the needle valve 70, it is also controlled by the thermostat 43 which is responsive to the temperature of the engine. To this end, such thermostat 43 is provided at its free end with an abutment screw 85, upon which may rest a lateral finger or head 86 projecting from the upper end of the needle 70. When the engine is cold, the thermostat 43 lifts the needle 70 to allow more fuel to pass, causing the nut 77 to be separated from the sleeve 78. As the engine becomes hot, the thermostat 43 lets the needle 70 lower, until the nut 77 engages the sleeve 78.

The arrangement shown in Fig. 6 may be slightly modified as shown in Figs. 7 and 8. Here all the controls are provided on the adjusting screw 75 which controls the outlet from the supplemental fuel-supply passage 72. In this modification, the screw 75 is provided with an operating arm 90, which is loosely mounted on such screw, and the two are interconnected by the thermostat 43 which is responsive to the temperature of the engine. For a given position of the arm 90, the thermostat 43 backs off the screw 75 as the engine cools, and screws it in as the engine gets hot. The operating arm 90 is connected by a rod 91 to the core of the solenoid 36, and is spring-pressed in the direction to seat the adjusting screw 75, by a spring 92. When the solenoid 36 is energized, upon the closing of the starter motor, the arm 90 is swung in the direction to back off the adjusting screw 75, to let more fuel pass out through the fuel-supply opening 73. When the solenoid 36 is de-energized, the reverse action occurs, and the spring 92 moves the arm 90 to turn the screw 75 farther inward toward its seat, and thus to lessen the supply of fuel. As before, this returning movement or fuel-decreasing movement of the core of the solenoid 36 is limited by a cam 61 operated by the thermostat 50 which is responsive to the temperature of the air.

My invention may take various other forms, and those which I have illustrated are merely examples, to show the wide range of applicability of my invention.

I claim as my invention:

1. A mixture-enriching device for carbureters, comprising electro-magnetic means for varying the fuel-discharge in the carbureter, a starter motor and its control switch, connections to said electro-magnetic means to energize and de-energize it jointly with said starter motor upon the closing and opening of the starter-motor switch, and a thermostat also controlling said rate of fuel-discharge in the carbureter.

2. A mixture-enriching device for carbureters, comprising electro-magnetic means for varying the fuel-discharge in the carbureter, a starter motor and its control switch, connections to said electro-magnetic means to energize and de-energize it jointly with said starter motor upon the closing and opening of the starter-motor switch, and a thermostat responsive to the temperature of the air and also controlling said rate of fuel-discharge in the carbureter.

3. A mixture-enriching device for carbureters, comprising electro-magnetic means for varying the fuel-discharge in the carbureter, a starter motor and its control switch, connections to said electro-magnetic means to energize and de-energize it jointly with said starter motor upon the closing and opening of the starter-motor switch, and a thermostat responsive to the temperature of the engine and also controlling said rate of fuel-discharge in the carbureter.

4. A mixture-enriching device for carbureters, comprising electro-magnetic means for varying the fuel-discharge in the carbureter, a starter motor and its control switch, connections to said electro-magnetic means to energize and de-energize it jointly with said starter motor upon the closing and opening of the starter-motor switch, and two thermostats responsive respectively to the temperature of the air and to the temperature of the engine and also controlling said rate of fuel-discharge in the carbureter.

5. A mixture-enriching device for carbureters, comprising means for varying the rate of fuel-discharge in the carbureter, and two thermostats responsive respectively to the temperature of the air and to the temperature of the engine for controlling said fuel-discharge-varying means.

6. A mixture-enriching device for carbureters, comprising a starter device, means controlled jointly with said starter device for varying the rate of fuel-discharge in the carbureter, and a thermostat which also controls the rate of fuel-discharge in the carbureter.

7. A mixture-enriching device for carbureters, comprising a starter device, means controlled jointly with said starter device for varying the rate of fuel-discharge in the carbureter, and a thermostat which controls the extent to which said fuel-discharge-varying means varies the rate of fuel-discharge when the operation of the starter device ceases.

8. A mixture-enriching device for carbureters, comprising a starter device, means rendered operative jointly with the starter device for varying the proportion between the fuel-discharge in the carbureter and the air-flow through the carbureter, and a thermostat which also controls such proportion.

9. A mixture-enriching device for carbureters, comprising a starter device, means rendered operative jointly with the starter device for varying the proportion between the fuel-discharge in the carbureter and the air-flow through the carbureter, and a thermostat which is responsive to the temperature of the air and which also controls such proportion.

10. A mixture-enriching device for carbureters, comprising a started device, means rendered operative jointly with the starter device for varying the proportion between the fuel-discharge in the carbureter and the air-flow through the carbureter, and a thermostat which is responsive to the temperature of the engine and which also controls such proportion.

11. A mixture-enriching device for carbureters, comprising a starter device, means rendered operative jointly with the starter device for varying the proportion between the fuel-discharge in the carbureter and the air-flow through the carbureter, and two thermostats which are responsive to the temperature of the air and to the temperature of the engine respectively and both of which also control such proportion.

12. In combination, an internal combustion engine, a starter device therefor, means for supplying said internal combustion engine with a mixture of air and fuel, a thermostat, responsive to the temperature of the engine, and means controlled by the operation of said starter device and by said thermostat for varying the proportions of air and fuel in said mixture.

13. In combination, an internal combustion engine, a starter device therefor, means for supplying said internal combustion engine with a mixture of air and fuel, two thermostats responsive respectively to the temperature of the air and to the temperature of the engine, and means controlled by the operation of said starter device and by said two thermostats for varying the proportions of air and fuel in said mixture.

14. In combination, an internal combustion engine, means for supplying said internal combustion engine with a mixture of air and fuel, two thermostats responsive respectively to the temperature of the air and to the temperature of the engine, and means controlled by said two thermostats for varying the proportions of air and fuel in said mixture.

In witness whereof, I have hereunto set my hand at Indianapolis, Indiana, this 26th day of October, A. D. one thousand nine hundred and twenty three.

GLEN R. SISSON.